US011361767B2

(12) United States Patent
Taparia et al.

(10) Patent No.: US 11,361,767 B2
(45) Date of Patent: Jun. 14, 2022

(54) METHOD AND APPARATUS FOR CAPABILITY-BASED PROCESSING OF VOICE QUERIES IN A MULTI-ASSISTANT ENVIRONMENT

(71) Applicant: Samsung Electronics Co., Ltd., Gyeonggi-do (KR)

(72) Inventors: Ankit Taparia, New Delhi (IN); Mugula Satya Shankar kameshwar Sharma, Bangalore (IN); Deepak Kumar, New Delhi (IN); Shaktiman Dubey, Uttar Pradesh (IN); Rishabh Raj, Jharkhand (IN); Srikant Padala, West Bengal (IN); Aishwarya Vitthal Raimule, Maharashtra (IN); Kislay Pandey, New Delhi (IN); Mohit Loganathan, Telangana (IN)

(73) Assignee: Samsung Electronics Co., Ltd

( * ) Notice: Subject to any disclaimer, the term of this patent is extended or adjusted under 35 U.S.C. 154(b) by 230 days.

(21) Appl. No.: 16/670,693

(22) Filed: Oct. 31, 2019

(65) Prior Publication Data

US 2020/0135200 A1    Apr. 30, 2020

(30) Foreign Application Priority Data

Oct. 31, 2018 (IN) .............................. 201841041234
Sep. 24, 2019 (IN) ....................... 201841041234 CS

(51) Int. Cl.
*G10L 15/22*     (2006.01)
*G10L 15/30*     (2013.01)
(52) U.S. Cl.
CPC .............. *G10L 15/22* (2013.01); *G10L 15/30* (2013.01); *G10L 2015/223* (2013.01)

(58) Field of Classification Search
USPC ..................................... 704/1–504, 251, 231
See application file for complete search history.

(56) References Cited

U.S. PATENT DOCUMENTS

| 7,398,209 | B2 * | 7/2008 | Kennewick | ............. | G10L 15/22 |
| | | | | | 704/E15.04 |
| 9,729,592 | B2 | 8/2017 | Slayton et al. | | |
| 10,013,979 | B1 | 7/2018 | Roman et al. | | |
| 10,115,400 | B2 * | 10/2018 | Wilberding | ............... | G10L 15/22 |
| 10,237,137 | B2 * | 3/2019 | Helvey | .................... | H04W 4/30 |
| 10,663,938 | B2 * | 5/2020 | Rexach | ............ | G01N 35/00871 |
| 10,833,947 | B2 * | 11/2020 | Helvey | ............... | H04L 12/1403 |

(Continued)

FOREIGN PATENT DOCUMENTS

| EP | 2 933 789 | 10/2015 |
| WO | WO 2016/109122 | 7/2016 |

OTHER PUBLICATIONS

International Search Report dated Feb. 13, 2020 issued in counterpart application No. PCT/KR2019/014585, 10 pages.

*Primary Examiner* — Marcus T Riley
(74) *Attorney, Agent, or Firm* — The Farrell Law Firm, P.C.

(57) ABSTRACT

A method and an apparatus for processing audio commands includes receiving an audio command from a user, determining that a proper response to the audio command is unavailable in a first assistant device based on analyzing the audio command, transmitting the audio command to at least one second assistant device, and receiving at least one response to the audio command from the at least one second assistant device.

18 Claims, 12 Drawing Sheets

(56) References Cited

U.S. PATENT DOCUMENTS

| | | | |
|---|---|---|---|
| 11,038,934 B1* | 6/2021 | Hansen | H04L 65/403 |
| 11,043,220 B1* | 6/2021 | Hansen | H04L 67/025 |
| 2013/0006638 A1 | 1/2013 | Lindahl | |
| 2013/0290234 A1* | 10/2013 | Harris | G06N 5/022 |
| | | | 901/50 |
| 2013/0322634 A1* | 12/2013 | Bennett | H04R 5/00 |
| | | | 704/274 |
| 2014/0201629 A1 | 7/2014 | Heck | |
| 2017/0092278 A1* | 3/2017 | Evermann | G10L 15/22 |
| 2018/0040324 A1* | 2/2018 | Wilberding | G06F 3/167 |
| 2018/0077025 A1* | 3/2018 | Helvey | H04L 67/125 |
| 2018/0190289 A1* | 7/2018 | Subhojit | G10L 15/06 |
| 2019/0089550 A1* | 3/2019 | Rexach | H04L 12/282 |
| 2019/0090056 A1* | 3/2019 | Rexach | H04R 3/005 |
| 2019/0120809 A1* | 4/2019 | Rexach | G06F 1/3231 |
| 2019/0139002 A1* | 5/2019 | Kumar | G06Q 10/1095 |
| 2019/0146438 A1* | 5/2019 | Rexach | C02F 1/001 |
| | | | 700/275 |
| 2020/0076696 A1* | 3/2020 | Helvey | H04L 41/046 |
| 2020/0110864 A1* | 4/2020 | Casado | G10L 15/22 |
| 2020/0135200 A1* | 4/2020 | Taparia | G10L 15/30 |

\* cited by examiner

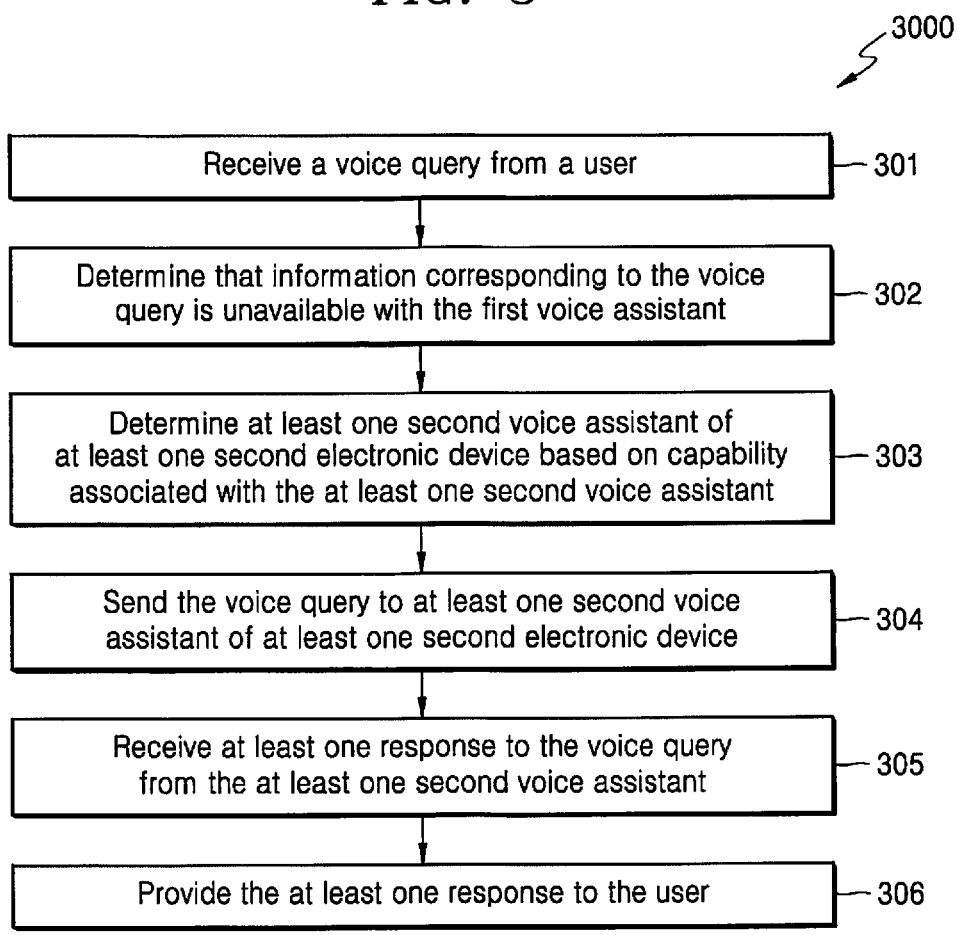

METHOD AND APPARATUS FOR CAPABILITY-BASED PROCESSING OF VOICE QUERIES IN A MULTI-ASSISTANT ENVIRONMENT

CROSS-REFERENCE TO RELATED APPLICATION(S)

This application is based on and claims priority under 35 U.S.C. § 119 to Indian Provisional Application No. 201841041234 (PS), which was filed in the Indian Intellectual Property Office on Oct. 31, 2018, and Indian Complete Application No. 201841041234 (CS), which was filed in the Indian Intellectual Property Office on Sep. 24, 2019, the disclosures of each of which are incorporated herein by reference in their entireties.

BACKGROUND

1. Field

The present disclosure relates generally to a field of computing devices, and more particularly, to a method and an apparatus for capability-based processing of voice queries in a multi-assistant environment.

2. Description of Related Art

A voice assistant attains the role of a personal assistant for providing a response to voice commands of a user. Voice assistants such as Alexa®, Google Assistant®, Bixby®, Cortana®, and Siri® have been implemented in electronic devices such as smart phones, tablets, laptops, wireless audio devices (e.g. a Wi-Fi speaker and a Bluetooth speaker), and Internet of things (IoTs) devices for providing responses to voice commands or voice queries of the user. However, capabilities such as booking a cab, playing a song, navigating to a location, giving an answer to a general knowledge question of each voice assistant are limited.

SUMMARY

The present disclosure has been made to address the above-mentioned problems and disadvantages, and to provide at least the advantages described below.

In accordance with an aspect of the present disclosure, provided is a method for processing audio commands by a first assistance device, the method including receiving an audio command from a user, determining that a proper response to the audio command is unavailable in the first assistant device based on analyzing the audio command, transmitting the audio command to at least one second assistant device, and receiving at least one response to the audio command from the at least one second assistant device.

In accordance with another aspect of the present disclosure, provided is a first assistant apparatus for processing an audio command, the apparatus including a sensor configured to receive an audio command from a user, and a processor configured to determine that a proper response to the audio command is unavailable based on analyzing the audio command, transmit the audio command to at least one second assistant device, and receive at least one response to the audio command from the at least one second assistant device.

In accordance with another aspect of the present disclosure, provided is a non-transitory computer-readable medium storing instructions thereon that, when executed, instruct at least one processor to perform a method to receive an audio command from a user, determine that a proper response to the audio command is unavailable in the first assistant device based on analyzing the audio command; transmit the audio command to at least one second assistant device; and receive at least one response to the audio command from the at least one second assistant device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates a flow diagram of capability-based processing of voice queries in a multi-assistant environment for providing at least one response to a user, according to an embodiment;

DETAILED DESCRIPTION

Figure 1A:
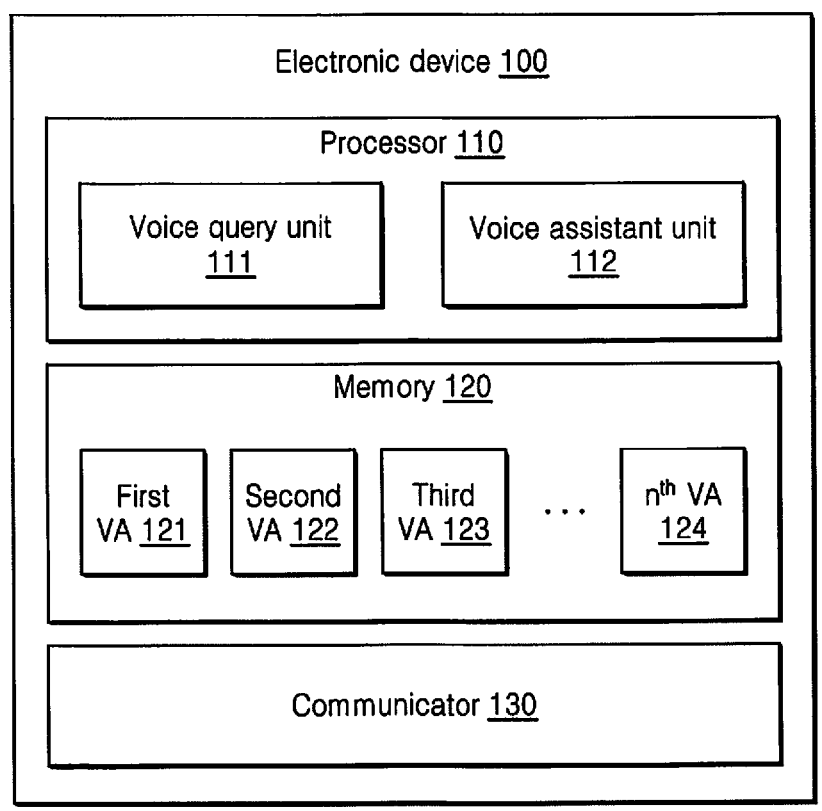
FIG. 1A illustrates a block diagram of an electronic device for capability-based processing of audio commands in a multi-assistant environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

As used herein, the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electronic or other signals. A non-transitory computer-readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Provided is a method for capability-based processing of voice queries in a multi-assistant environment. The method may include receiving, by a first voice assistant, a first voice query from a first user. The method may further include providing, by the first voice assistant, a first response for the first voice query by executing the first voice query. The method may include storing, by a second voice assistant, the first voice query. The method may include receiving, by the second voice assistant, a second voice query from one of the first user and a second user. The method may include determining, by the second voice assistant, that the second voice query is related to the stored first voice query. The method may include feeding, by the second voice assistant, the second voice query to the first voice assistant for providing a second response for the second voice query, in response to determining that the second voice query is related to the stored first voice query.

The first voice assistant and the second voice assistant may be present in a single electronic device.

The first voice assistant may be present in a first electronic device and the second voice assistant may be present in a second electronic device.

The second voice assistant may determine that the first voice assistant has executed the first voice query based on a capability of the first voice assistant.

The method may include, upon determining by the second voice assistant that the second voice query is related to the stored first voice query, identifying, by the second voice assistant, a relationship between the first voice query and the second voice query based on a type of voice queries and determining, by the second voice assistant, that the second voice query is related to the stored first voice query based on the relationship between the first voice query and the second voice query.

The type of the voice queries may include a voice query for booking a vehicle, a voice query for playing a multimedia file, a voice query for initiating navigation, a voice query of asking general knowledge question, a voice query for sending messages and a voice query for ordering eatables, groceries and fashion accessories Additionally, provided is a method for capability-based processing of voice queries in a multi-assistant environment. The method may include receiving, by a first voice assistant of a first electronic device, a voice query from a user. The method may include determining, by the first voice assistant, that information corresponding to the voice query is unavailable with the first voice assistant. The method may include determining, by the first voice assistant, at least one second voice assistant of at least one second electronic device based on a capability associated with the second voice assistant. The method may include sending, by the first voice assistant, the voice query to the at least one second voice assistant of the at least one second electronic device. The method may include receiving, by the first voice assistant, at least one response to the voice query from the at least one second voice assistant. The method may include providing, by the first voice assistant, the at least one response to the user.

When the first voice assistant is unable to generate the at least one response for the voice query, the information corresponding to the voice query may be unavailable to the first voice assistant.

The second voice assistant may receive the voice query based on at least one of the proximity of the second voice assistant to the first voice assistant and the capability of the second voice assistant to execute the voice query.

In addition, provided is a method for capability-based processing of voice queries in a multi-assistant environment. The method may include receiving, by the first voice assistant of a first electronic device, a first voice query from a user. The method may include generating, by the first voice assistant, a second voice query for at least one second voice assistant of at least one second electronic device based on the first voice query. The method may include sending, by the first voice assistant, the second voice query to the at least one second voice assistant. The method may include receiving, by the first voice assistant, at least one response to the second voice query from the at least one second voice assistant. The method may include generating, by the first voice assistant, a candidate response for the first voice query by combining the at least one response received from the at least one second voice assistant for the second voice query. The method may include providing, by the first voice assistant, the candidate response to the user.

The second voice query may be generated by modifying the first voice query to report the first voice query.

The candidate response may be an optimized response selecting from the at least one response for the second voice query.

The at least one second voice assistant may receive the second voice query based on the capability of the at least one second voice assistant to execute the voice query.

Accordingly, provided is an electronic device for capability-based processing of voice queries in a multi-assistant environment. The electronic device may include a memory and a processor, where the processor is coupled to the memory. The processor may be configured to receive a first voice query from a first user using a first voice, provide a first response for the first voice query by executing the first voice query using a first voice assistant, store the first voice query using a second voice assistant, receive a second voice query from one of the first user and a second user using the second voice assistant, determine that the second voice query is related to the stored first voice query using the second voice assistant, and feed the second voice query to the first voice assistant using the second voice assistant for providing a second response for the second voice query in response to determining that the second voice query is related to the stored first voice query.

In addition, provided is a system for capability-based processing of voice queries in a multi-assistant environment. The system may include a plurality of electronic devices, in which a first electronic device includes a first voice assistant and a second electronic device includes a second voice assistant. The first electronic device may be configured to receive a first voice query from a first user. The first electronic device may be configured to provide a first response for the first voice query by executing the first voice query. The second electronic device may be configured to store the first voice query. The second electronic device may be configured to receive a second voice query from one of the first user and a second user. The second electronic device may be configured to determine that the second voice query is related to the stored first voice query. The second electronic device may be configured to feed the second voice query to the first electronic device, where the first electronic device processes the second voice query using the first voice assistant and provides a second response for the second voice query, in response to determining that the second voice query is related to the stored first voice query.

Additionally, provided is a first electronic device for capability-based processing of voice queries in a multi-assistant environment. The electronic device may include a memory and a processor, where the processor is coupled to the memory. The processor may be configured to receive a voice query from a user. The processor may be configured to determine that information corresponding to the voice query is unavailable with the first voice assistant. The processor may be configured to determine at least one second voice assistant of at least one second electronic device based on a capability associated with the at least one second voice assistant. The processor may be configured to send the voice query to the at least one second voice assistant of the at least one second electronic device. The processor may be configured to receive at least one response to the voice query from the at least one second voice assistant. The processor may be configured to provide the at least one response to the user.

Accordingly, a first electronic device for capability-based processing of voice queries in a multi-assistant environment is provided. The electronic device may include a memory and a processor, wherein the processor may be coupled to the memory. The processor may be configured to receive a first voice query from a user. The processor may be configured to generate a second voice query for at least one second voice assistant of at least one second electronic device based on the first voice query. The processor may be configured to send the second voice query to the at least one second voice assistant. The processor may be configured to receive at least one response to the second voice query from the at least one second voice assistant. The processor may be configured to generate a candidate response for the first voice query by combining the at least one response received from the at least one second voice assistant for the second voice query. The processor may be configured to provide the candidate response to the user.

FIGS. 1A through 8, discussed below, and the various embodiments used to describe the principles of the disclosure are by way of illustration only and should not be construed to limit the scope of the disclosure. Those skilled in the art will understand that the principles of the present disclosure may be implemented in any suitably arranged system or device.

The various embodiments described herein are not necessarily mutually exclusive, as some embodiments can be combined with one or more other embodiments to form new embodiments. The term "or" as used herein, refers to a non-exclusive combination, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, or hardware components, are physically implemented by analog and/or digital circuits such as logic gates, integrated circuits, microprocessors, microcontrollers, memory circuits, passive electronic components, active electronic components, optical components, and hardwired circuits, and may optionally be driven by firmware and software. The circuits may, for example, be embodied in one or more semiconductor chips, or on substrate supports such as printed circuit boards. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks without departing from the scope of the disclosure. Likewise, the blocks of the embodiments may be physically combined into more complex blocks without departing from the scope of the disclosure.

Although the terms first and second may be used herein to describe various elements, these elements should not be limited by these terms. These terms are generally used to distinguish one element from another.

Voice assistants are designed to provide responses to specific types of voice commands, such as a voice command for booking a cab, playing a song, global positioning, satellite (GPS) navigation, and requesting a response to a general knowledge question. For example, an electronic device may be a first assistant device which is only capable of providing a response to the voice commands of the user to reproduce multimedia content and a second assistant device which is only capable of providing a response to the voice command of the user to control IoT devices. The first assistant device cannot provide a response to the user, in response to receiving the voice command of controlling the IoT devices. In sum, the user has to remember the capability of each assistant device before providing a query to each assistant device to receive fully functional services.

Further, the first assistant device is unaware of the capability of the second voice assistant device which may be able to control the IoT devices. However, knowledge sharing between the assistant devices about the capabilities of each voice assistant is desirable for generating the most appropriate and accurate response for every type of audio command. Throughout the description, a "voice command", a "voice query", and a "voice assistant device" may be used interchangeably with an "audio command", "an audio query", and "an assistant device", respectively.

Accordingly, the present disclosure provides a method for capability-based processing of audio commands or queries in a multi-assistant environment. The method may include receiving, by a first assistant device, a first audio query from a first user, providing, by the first assistant device, a first response to the first audio query by executing the first audio query, storing, by a second assistant device, the first audio query, receiving, by the second assistant device, a second audio query from one of the first user and a second user, determining, by the second assistant device, whether the second audio query is related to the stored first audio query, determining, by the second assistant device, that the first audio assistant has executed the first audio query, feeding, by the second voice assistant, the second audio query to the first assistant device for providing a second response for the second audio query.

The method enables an electronic device to provide at least one response to the user for any type of voice query, even when the electronic device is capable of processing only a limited type of voice queries. Moreover, the electronic device may provide a candidate response (i.e. an optimal response) from multiple response sources upon receiving responses from multiple assistant devices in response to an audio query. Therefore, the method improves the user experience of receiving the responses from the electronic device.

FIG. 1A illustrates a block diagram of an electronic device for capability-based processing of audio commands in a multi-assistant environment, according to an embodiment. Non-limiting examples for the electronic device 100 are a smart phone, a tablet computer, a personal computer, a desktop computer, a personal digital assistants (PDA), a multimedia device, a wireless audio device (e.g. a Wi-Fi speaker or a Bluetooth™ speaker), a wearable device, or an IoT device.

The electronic device 100 may include a processor 110, a memory 120 and a communicator 130, wherein the processor 110 is coupled to the memory 120. The processor 110 may include a voice query unit 111 and a voice assistant (VA) unit 112. The memory 120 may store a plurality of VAs (i.e. first VA 121, a second VA 122, a third VA 123 . . . an $n^{th}$ VA 124). The electronic device may be a personal assistant device or an assistant device.

Capabilities of each voice assistant among first VA 121-$n^{th}$ VA 124 are limited. Examples for the capabilities may include, but not limited to, booking a cab, playing a song, ordering food, playing music, navigating to a certain location, providing an answer to a general knowledge question, or sending instant messages. Each VA among the first VA 121-$n^{th}$ VA 124 is designed to provide a response for a specific type of voice queries. Examples for different type of voice queries are, but are not limited to, a voice query for booking the cab, a voice query for playing the song, a voice query for initiating navigation, a voice query of asking the general knowledge question, a voice query for ordering the food, a voice query for playing the music, or a voice query for sending the instant messages.

The processor 110 is configured to receive a first voice query from a first user using the first VA 121 in the plurality of VAs (i.e. first VA 121-$n^{th}$ VA 124). The electronic device 100 may include an audio sensor, such as a microphone. The audio sensor may receive the first voice query from the first user and send it to the voice query unit 111. Further, the voice query unit 111 may send the first voice query to the first VA 121. The voice query unit 111 may send the first voice query to the first VA 121 based on availability of the first VA 121 in proximity of the first user or a user request to execute the first voice query by the first VA 121.

The processor 110 may be configured to provide a first response for the first voice query by executing the first voice query using the first VA 121. The electronic device 100 may include at least one of a display screen and an audio sink. An example of the display screen is a liquid crystal display (LCD) or a light-emitting diode (LED) display. The display screen displays responses by first VA 121-$n^{th}$ VA 124 to the user. An example of the audio sink is a speaker. The audio sink generates an audio response for providing the response of the first VA 121-$n^{th}$ VA 124 to the user. The VA unit 112 uses the first VA 121 to provide the first response for the first voice query by controlling the first VA 121 to execute the first voice query.

The processor 110 is configured to store the first voice query in the memory 120. Further, the processor 110 is configured to receive a second voice query from one of the first user and a second user using a second VA 122 in the plurality of VAs (i.e. first VAA 121-$n^{th}$ VA 124). The audio sensor may receive the second voice query from one of the first user and the second user and send the second voice query to the voice query unit 111. Further, the voice query unit 111 may send the second voice query to the second VA 122. The voice query unit 111 may send the second voice query to the second VA 122 based on the availability of the second VA 122 in the proximity of the one of the first user and the second user, or based on a user request to execute the second voice query by the second VA 122.

The processor 110 may be configured to determine that the second voice query is related to the stored first voice query using the second VA 122. The voice query unit 111 may determine that the second voice query is related to the stored first voice query using the second VA 122. The voice query unit 111 may identify a relationship between the first voice query and the second voice query based on a type of voice queries. Further, the voice query unit 111 may determine that the second voice query is related to the stored first voice query based on the relationship between the first voice query and the second voice query. The second voice query may be related to the first voice query when both the voice queries are of the same type. The voice query or voice command may be of the same type if the response is generated using a same or similar application or function. For example, both of the voice queries—"book a cab to LA" and "I need to call a taxi to San Diego" may be of the same type because both of the voice queries trigger a cab booking application in a voice assistant device.

The processor 110 may be configured to determine that the first VA 121 has executed the first voice query using the second VA 122. The VA unit 112 may determine that the first VA 121 has executed the first voice query using the second VA 122. The VA unit 112 may determine that the first VA 121 has been executed, based on the capability of the first VA 121, to process the first voice query. The processor 110 may be configured to feed the second query to the first VA 121 using the second VA 122 for providing a second response for the second query to one of the first user and the second user. The voice query unit 111 may feed the second voice query to the first VA 121 using the second VA 122.

The VA unit 112 may feed the second voice query to the first VA 121 using the second VA 122, in response to determining that the second VA 122 is incapable of executing the second voice query. Further, the first VA 122 may execute the second voice query and generate the second response for the second voice query. Further, the VA unit 112 may provide the second response to one of the first user and the second user using the first VA 121. The VA unit 112 may provide the second response to the second VA 122 using the first VA 121. Further, the second VA 122 may provide the second response to one of the first user and the second user.

The processor 110 is configured to execute instructions stored in the memory 120. The memory 120 may include non-volatile storage elements. Examples of such non-volatile storage elements may include magnetic hard discs, optical discs, floppy discs, flash memories, or forms of an electrically programmable memory (EPROM) or an electrically erasable and programmable memory (EEPROM). In addition, the memory 120 may, in some examples, be considered to be a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory 120. In certain examples, a non-transitory storage medium may store data that can, over time, change (e.g., in RAM or cache).

The communicator 130 may be configured to communicate internally between hardware components in the electronic device 100. Further, the communicator 130 may be configured to facilitate communication between the electronic device 100 and other electronic devices.

Although the FIG. 1A illustrates hardware components of the electronic device 100, it is to be understood that other embodiments are possible. In other embodiments, the electronic device 100 may include less or more components. Further, the labels or names of the components are used only for illustrative purpose and does not limit the scope of the disclosure. One or more components can be combined together to perform the same or substantially similar function for capability-based processing of the voice queries in the multi-assistant environment.

Figure 1B:
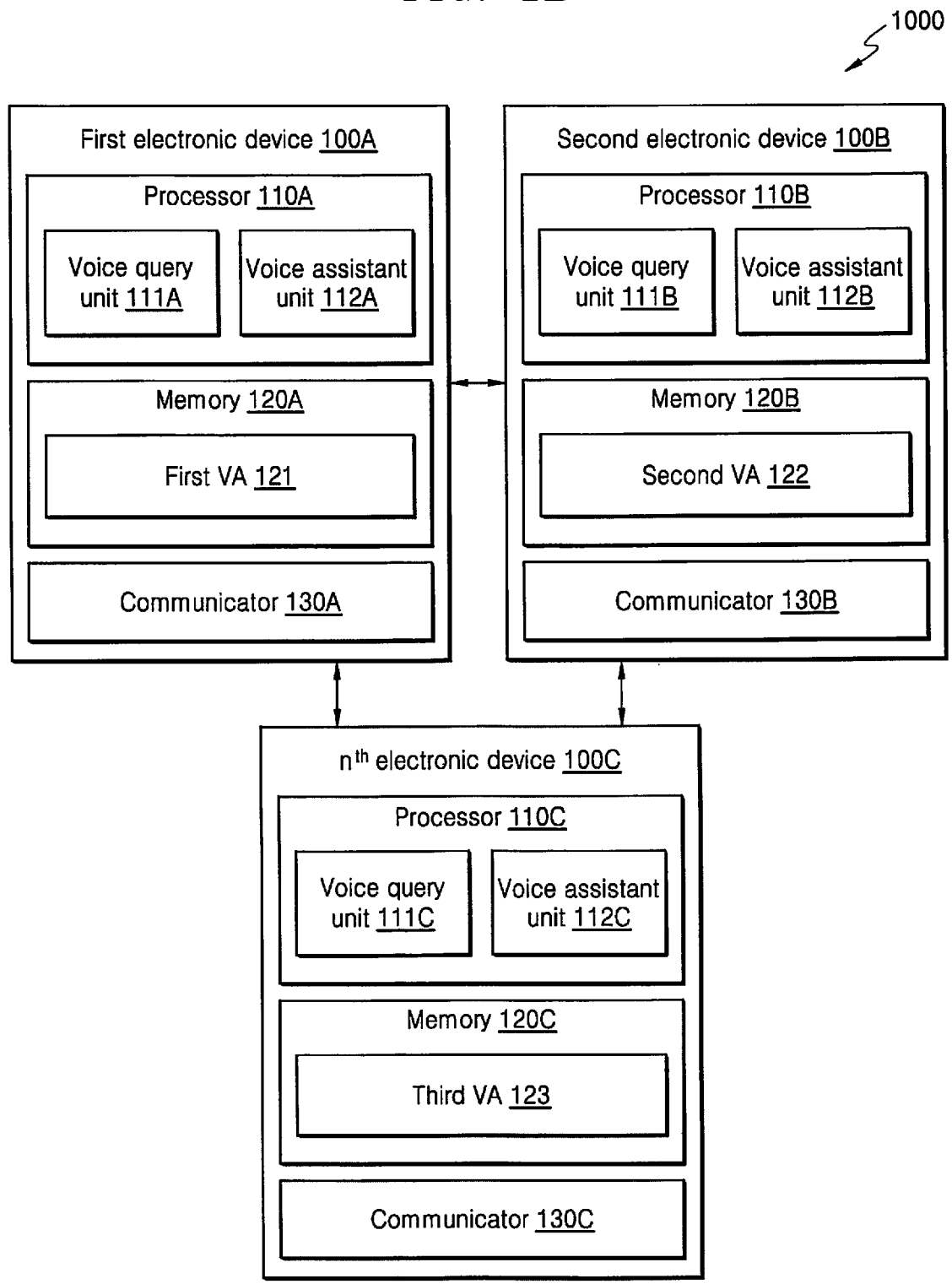
FIG. 1B illustrates a block diagram of a system for capability-based processing of voice queries in a multi-assistant environment, according to an embodiment.

FIG. 1B illustrates a block diagram of a system 1000 for capability-based processing of voice queries in a multi-assistant environment, according to an embodiment. The system 1000 includes a plurality of electronic devices (i.e. a first electronic device 100A, a second electronic device 100B . . . to an $n^{th}$ electronic device 100C), where the first electronic device 100A-the $n^{th}$ electronic device 100C are connected to each other via a wired or wireless network. Each of the plurality of electronic devices may be able to act as a voice assistant device.

The first electronic device 100A-the $n^{th}$ electronic device 100C may include similar hardware elements of the electronic device 100, where each of the first electronic device 100A-the $n^{th}$ electronic device 100C includes at least one different VA.

The first electronic device 100A may include the first VA 121, the second electronic device 100B may include the second VA 122, and the $n^{th}$ electronic device 100C may include the third VA 123, etc.

The first electronic device 100A may include a processor 110A, a memory 120A and a communicator 130A, where the processor 110A is coupled to the memory 120A. The processor 110A may include a voice query unit 111A and a VA unit 112A. The second electronic device 100B may include a processor 110B, a memory 120B and a communicator 130B, where the processor 110B is coupled to the memory 120B. The processor 110B may include a voice query unit 111B and a VA unit 112B. The $n^{th}$ electronic device 100C may include a processor 110C, a memory 120C and a communicator 130C, where the processor 110C is coupled to the memory 120C. The processor 110C may include a voice query unit 111C and a VA unit 112C.

The first electronic device 100A may be configured to receive the first voice query from the first user. An audio sensor of the first electronic device 100A may receive the first voice query from the first user and send it to the voice query unit 111A. Further, the voice query unit 111A may send the first voice query to the first VA 121. The voice query unit 111A may send the first voice query to the first VA 121 based on the availability of the first VA 121 in the proximity of the first user or the user request to execute the first voice query by the first VA 121.

The first electronic device 100A may be configured to provide the first response for the first voice query by executing or processing the first voice query. The VA unit 112A may use the first VA 121 to provide the first response for the first voice query by controlling the first VA 121 to execute or process the first voice query. Processing of the voice query may include recognizing the content included in the voice query and determining a function corresponding to the voice query by analyzing the content of the voice query.

The second electronic device 100B may be configured to store the first voice query. The memory 120B may store the first voice query. The second electronic device 100B may be configured to receive the second voice query from one of the first user and the second user. The audio sensor may receive the second voice query from one of the first user and the second user and send the second voice query to the voice query unit 111B. Further, the voice query unit 111B may send the second voice query to the second VA 122. The voice query unit 111B may send the second voice query to the second VA 122 based on the availability of the second VA 122 in the proximity of the one of the first user and the second user or a user request to execute the second voice query by the second VA 122. The second electronic device 100B may be configured to determine that the second voice query is related to the stored first voice query. The voice query unit 111B may determine that the second voice query is related to the stored first voice query.

The second electronic device 100B may be configured to determine that the first VA 121 has executed or processed the first voice query. The VA unit 112B may determine that the first VA 121 has executed or processed the first voice query using the second VA 122. The second electronic device 100B may be configured to feed the second voice query to the first electronic device 110A. The voice query unit 111B feeds the second voice query to the first electronic device 110A. The first electronic device 100A may be configured to process the second voice query using the first VA 121. The VA unit 112A may process the second voice query using the first VA 121. The first electronic device 100A may be configured to provide the second response for the second voice query, directly or via the second electronic device 100B, to one of the first user and the second user.

The VA unit 112B may feed the second voice query to the first VA 121 using the second VA 122, in response to determining that the second VA 122 is incapable of executing or processing the second voice query. Further, the first VA 121 may execute the second voice query and generate the second response for the second voice query. Further, the VA unit 112A may provide the second response to one of the first user and the second user using the first VA 121. The VA unit 112A may provide the second response to the second VA 122 using the first VA 121. Further, the second VA 122 may provide the second response to one of the first user and the second user.

The first electronic device 100A-$n^{th}$ electronic device 100C may include at least one of the display screen and the audio sink. The display screen may display responses of first VA 121-$n^{th}$ VA 124 to the user for providing the responses to the user. The audio sink may display the audio response for providing the response of VA 121-$n^{th}$ VA 124 to the user.

The processor 110A may be configured to receive a voice query from a user using the first VA 121. The audio sensor may receive the voice query from the user and send it to the voice query unit 111. Further, the voice query unit 111A may send the voice query to the first VA 121. The voice query unit 111A may send the voice query to the first VA 121 based on the availability of the first VA 121 in proximity of the user or the user request to execute the first voice query by the first VA 121. The processor 110A may be configured to determine that information or a function corresponding to the voice query is unavailable in the first VA 121. The information corresponding to the voice query may be unavailable in the first VA 121, when the first VA 121 is unable to generate the response for the voice query. The voice query unit 111A may determine that the information or the function corresponding to the voice query is unavailable in the first VA 121.

The processor 110A may be configured to determine at least one second VA 122 of at least one second electronic device 100B based on the capability associated with the at least one second VA 122. The at least one second VA 122 of at least one second electronic device 100B may be determined to be capable of generating the response for the voice query when the at least one second VA 122 may have an appropriate application or function which satisfies at least one action required by the voice query. The VA unit 112A may determine the at least one second VA 122 of the at least one second electronic device 100B to be capable of accomplishing the required action based on the capability associated with the at least one second VA 122. The second VA 122 may receive the voice query based on at least one of proximity of the second VA 122 to the first VA 121 and the capability of the second VA 122 to execute or process the voice query. The processor 110A may be configured to send the voice query to the at least one second VA 122 of the at least one second electronic device 100B. The voice query unit 111A may send the voice query to the at least one second VA 122 of the at least one second electronic device 100B. The processor 110A may be configured to receive the at least one response to the voice query from the at least one second VA 122. The VA unit 112A may receive the at least one response to the voice query from the at least one second VA 122. The processor 110A may be configured to provide the at least one response to the voice query to the user. The VA unit 112A may provide the at least one response to the user. The processor 110A may be configured to receive the first voice query from the user using the first VA 121. The voice query unit 111A may receive the first voice query from the user using the first VA 121. The audio sensor may receive the first voice query from the user and send it to the voice query unit 111A. Further, the voice query unit 111A may send the first voice query to the first VA 121. The voice query unit 111A may send the first voice query to the first VA 121 based on the availability of the first VA 121 in the proximity of the user or the user request to execute or process the first voice query by the first VA 121.

The processor 110A may be configured to analyze the second voice query for the at least one second VA 122 of at least one second electronic device 100B based on the first voice query. For example, the second voice query may be analyzed by modifying the first voice query to report the first voice query to other electronic devices. The voice query unit 111A may analyze the second voice query for the at least one second VA 122 of at least one second electronic device 100B based on the first voice query. The processor 110A may be configured to instruct the voice query unit 111A to send the second voice query to the at least one second VA 122. The processor 110A may be configured to receive the at least one response to the second voice query from the at least one second VA 122. The VA unit 112A may receive the at least one response to the second voice query from the at least one second VA 122.

The processor 110A may be configured to generate a candidate response for the first voice query by combining the at least one response received from the at least one second VA 122 for the second voice query. The VA unit 112A generates the candidate response for the first voice query by combining the at least one response received from the at least one second VA 122 for the second voice query. For example, the candidate response may be generated by generating knowledge obtained from multiple responses to the user and providing a suggestion to the user. The processor 110 may be configured to select the candidate response from the multiple responses to the second voice query. The candidate response may be an optimized response selected from the multiple responses for the second voice query. For example, "I am hungry" may be the second voice query received by the first electronic device 100A and transmitted to the second electronic device 100B and/or the third electronic device 100C. The first electronic device 100A may receive the response "Dad is busy" from the second electronic device 100B.

The first electronic device 100A may receive the response, "Food is found in the refrigerator" from the third electronic device 100C. The first electronic device 100A may detect the response, "Food is found in the refrigerator" as a candidate response, where the response, "Food is found in the refrigerator" is the optimized response. Further, the first electronic device 100A selects the response, "Food is found in the refrigerator" to be delivered to the user. The VA unit 112A may select the candidate response from the at least one response received from the at least one second VA 122 for the second voice query. The processor 110A may be configured to provide the candidate response to the user. The VA unit 112A may provide the candidate response to the user.

The first electronic device 100A may receive an audio command from a user. The audio command may be a voice command that may include a voice query by the user.

Upon receiving the audio command, the processor 110A may determine whether a proper response to the audio command can be made or may be available at the first electronic device 100A based on analyzing the audio command. For example, if the audio command is "playing a rap song!" and a piece of rap music is available at the first electronic device 100A or can connect to any server capable of providing the piece of rap music via a network, the first electronic device 100A may play a rap song in response to the audio command. By contrast, the processor 110A may determine that the first electronic device 100A cannot provide rap music from the memory 120A or via a network, and the first electronic device 100A may, based on the determination that a proper response is unavailable, transmit the audio command to various devices such as the second electronic device 100B and $n^{th}$ electronic device 100C connected to a network. The various devices connected to the network including the second electronic device 100B, the third electronic device, . . . and the $n^{th}$ electronic device 100C may be authorized to be used by the same user of the first electronic device 100A.

If the first electronic device 100A determines that it is not capable of providing "a taxi booking service" in response to a voice command of "Hey! book a cab!" because the first electronic device 100A does not have a taxi booking application stored in the memory 120A and controlled by the processor 110A, the first electronic device 100A may forward the voice command to another assistant device containing a taxi booking application and capable of providing the taxi booking service therewith.

Based on the determination that a proper response is unavailable, the first electronic device 100A may receive at least one response among a plurality of responses from the various devices connected to the network. The first electronic device 100A may determine the most proper response among the plurality of responses. For example, the first response from the second electronic device 100B may be a 20-second long rap music with two-star rating by various users and the second response from the $n^{th}$ electronic device 100C may be a 3-minute long rap music with four-star rating by various users. The first electronic device 100A may select, by analyzing both of the two responses, the second response as the most proper response to the user based on parameters such as consumer ratings and the length of the song. The parameters for selecting the most proper response may include various indexes or criteria. For example, the price will be the most important index in determining or selecting the most proper response when the query is, "How much is the brand new smart phone launched last month?" Time information may be a crucial index when the voice query is, "When does the No. 3000 bus come at the bus stop No. 21-111?" The parameter may also include location information if the query is, "What is the closest pizza restaurant?"

The first electronic device 100A may store responses from various devices connected to the network in a database of the first electronic device 100A for further use when a similar query is received from the user.

If the second electronic device 100B determines, upon receiving the transmitted audio command from the first electronic device 100A, that the second electronic device 100B is also unable to provide any proper response, then the second electronic device 100B may forward the audio command to other devices including a voice assistant connected to the network. If the second electronic device 100B receives any response from any other device connected to the network in response to the forwarding of the audio command, the second electronic device 100B may relay the response to the first electronic device 100A via the network.

Although FIG. 1B shows the hardware components of the system 1000, it is to be understood that other embodiments are not limited thereto. In other embodiments, the system 1000 may include more or less components. Further, the labels or names of the components are used only for illustrative purposes and do not limit the scope of the disclosure. One or more components can be combined together to perform the same or a substantially similar function for capability-based processing of the voice queries in the multi-assistant environment.

Figure 2A:
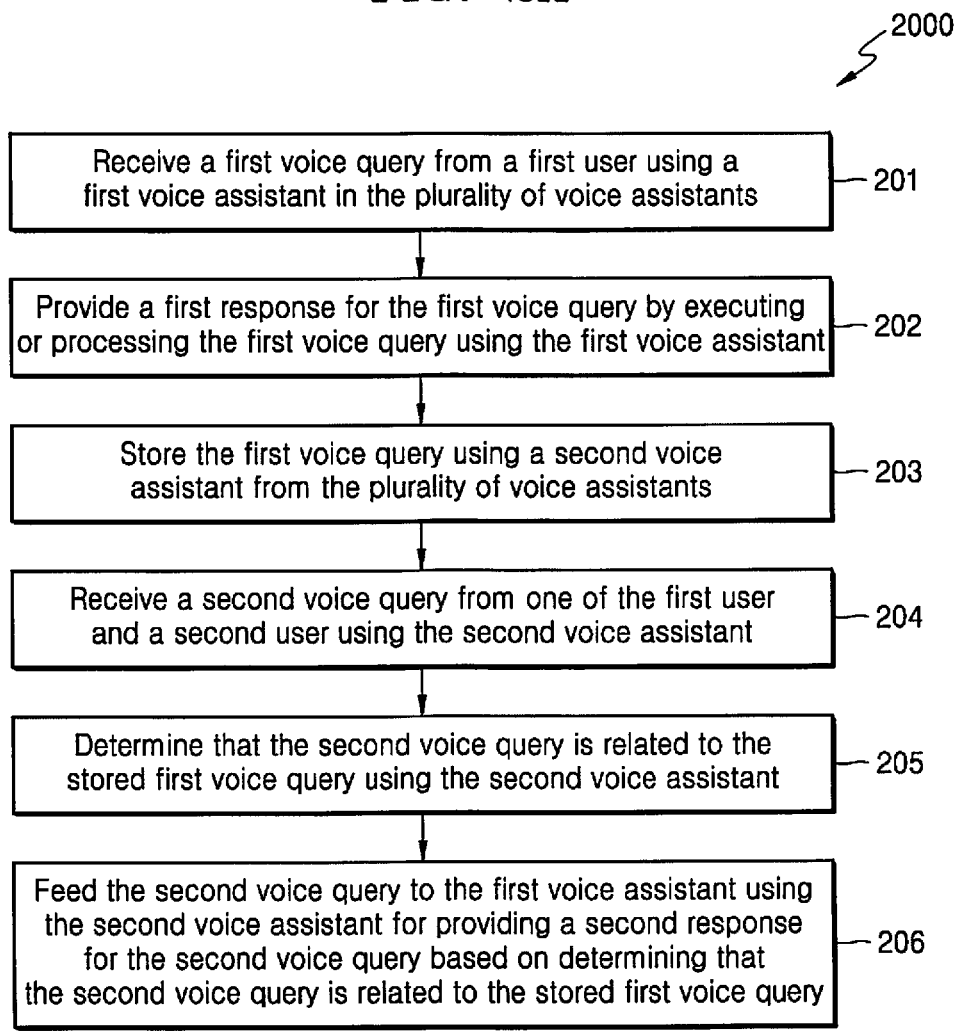
FIG. 2A illustrates a flow diagram of capability-based processing voice queries in a multi-assistant environment, according to an embodiment.

FIG. 2A illustrates a flow diagram 2000 of capability-based processing voice queries in the multi-assistant environment, according to an embodiment. The method includes receiving the first voice query from the first user using the first VA 121 in the plurality of VAs (i.e. first VA 121-$n^{th}$ VA 124) in step 201. The processor 110A may enable the audio sensor to receive the first voice query from the first user using the first VA 111 in the plurality of VAs (i.e. first VA 121-$n^{th}$ VA 124). In step 202, the first electronic device 100A provides the first response for the first voice query by executing or processing the first voice query using the first VA 121.

The processor 110A may allow the VA unit 112A to provide the first response for the first voice query by executing or processing the first voice query using the first VA 121. In step 203, the processor 110A stores the first voice query using the second VA 122 from the plurality of VAs (i.e. first VA 121-$n^{th}$ VA 124). The memory 120 may store the first voice query using the second VA 112 from the plurality of VAs (i.e. first VA 121-$n^{th}$ VA 124).

In step 204, the method includes receiving the second voice query from one of the first user and the second user using the second VA 122. The method may allow the voice query unit 111 to receive the second voice query from one of the first user and the second user using the second VA 122.

In step 205, the method includes determining that the second voice query is related to the stored first voice query using the second VA 122. The method may allow the voice query unit 111 to determine that the second voice query is related to the stored first voice query using the second VA 122.

In step 206, the method includes feeding the second voice query to the first VA 121 using the second VA 122 for providing the second response with respect to the second voice query, based on the determination that the second voice query is related to the stored first voice query. The method may allow the voice query unit 111A to feed the second voice query to the first VA 121 using the second VA 122 for providing the second response for the second voice query based on the determination that the second voice query is related to the stored first voice query.

Figure 2B:
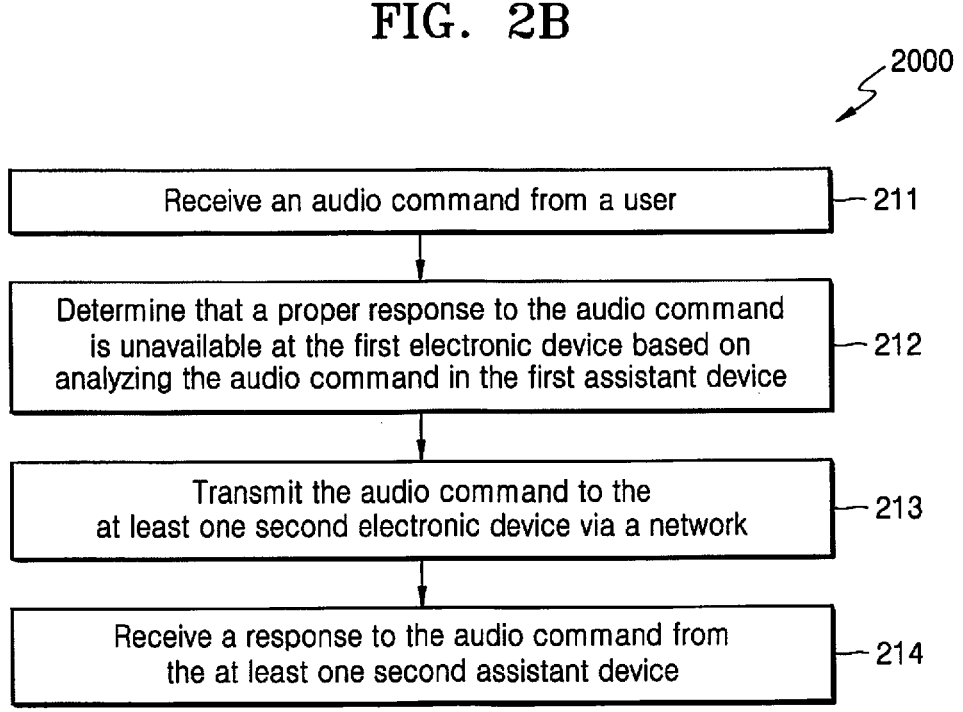
FIG. 2B illustrates a flow diagram of processing voice commands in a multi-assistant environment, according to an embodiment.

FIG. 2B illustrates a flow diagram 2100 for processing voice commands in the multi-assistant environment, according to an embodiment.

Referring to FIG. 2B, in step 211, the processor 110A receives an audio command from a user of the first electronic device 100A. The audio command may include a voice query of the user.

In step 212, the processor 110A determines that a proper response for the audio command is unavailable at the first electronic device 100A based on analyzing the audio command. The processor 110A may determine that a proper application to process the audio command is unavailable in the first electronic device 100A. For example, if the audio command is, "Please book a hotel in New York" and no hotel booking application is available at the first electronic device 100A or no appropriate connection to a hotel booking server is possible, the processor 110A may determine that a proper response for the audio command is unavailable at the first electronic device 100A. In such a case, the first electronic device 100A may attempt to connect to any other assistant device via a wired or a wireless network for secondhand assistant services.

In step 213, the processor 110A transmits the audio command to one device or other devices for processing the audio command. If there is a device capable of processing, i.e., generating a response to, the audio command, then the first electronic device 100A receives the processed response from the device in step 214. If there are multiple devices capable of processing the audio command, then the first electronic device 100 may receive multiple responses from the multiple devices, analyze each of the multiple responses, select the most appropriate response among the multiple responses based on various parameters, and provide the selected most appropriate response to the user in response to the audio command.

The parameters may include, but are not limited to, consumer or user ratings, price information, time information and/or location information obtained via a network or included in the response. Other devices may be authorized to be used by the same user. The processor 110A may store the multiple responses and only select the most appropriate response in a database or the memory 120A for further use when the user inputs the same audio command as or similar audio command to the current audio command. There may be a situation where even all the connected devices are not capable of processing the audio command. In such a case, the connected device receiving the audio command may forward the received audio to another device connected via a network and receive a processed response to the audio command generated at the other device which was not connected by the first electronic device 100A. The connected device may relay the received response to the first electronic device 100A.

The various actions, acts, blocks, steps, or the like in the flow diagram 2000 may be performed in the order presented, in a different order or simultaneously. Further, in some embodiments, some of the actions, acts, blocks, steps, or the like may be omitted, added, modified, skipped, or the like without departing from the scope of the disclosure.

FIG. 3 illustrates a flow diagram 3000 of capability-based processing of voice queries in a multi-assistant environment for providing at least one response to a user, according to an embodiment.

In step 301, the method includes receiving the voice query from the user. The voice query unit 111A may receive the voice query from the user.

In step 302, the processor 110A determines that the information, a proper response, or generating the proper response corresponding to the voice query is unavailable at the first electronic device 100A. The voice query unit 111A may determine that the information is unavailable, a proper response is unavailable, or generating the proper response is unavailable corresponding to the voice query for the first VA 121. In step 303, the method includes determining the at least one second VA 122 of at least one second electronic device 100B based on the capability associated with the at least one second VA 122. The VA unit 112A may determine the at least one second VA 122 of at least one second electronic device 100B to be appropriate for proceeding with the voice query based on the capability associated with the at least one second VA 122.

In step 304, the method includes sending the voice query to the at least one second VA 122 of the at least one second electronic device 100B. The voice query unit 111A may send or process the voice query to or with the at least one second VA 122 of the at least one second electronic device 100B. In step 305, the method includes receiving the at least one response to the voice query using the at least one second VA 122. The method may allow the VA unit 112A to obtain the at least one response to the voice query from or using the at least one second VA 122. In step 305, the method includes providing the at least one response to the user. The VA unit 112A may provide the at least one response to the user.

The various actions, acts, blocks, steps, or the like in the flow diagram 3000 may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
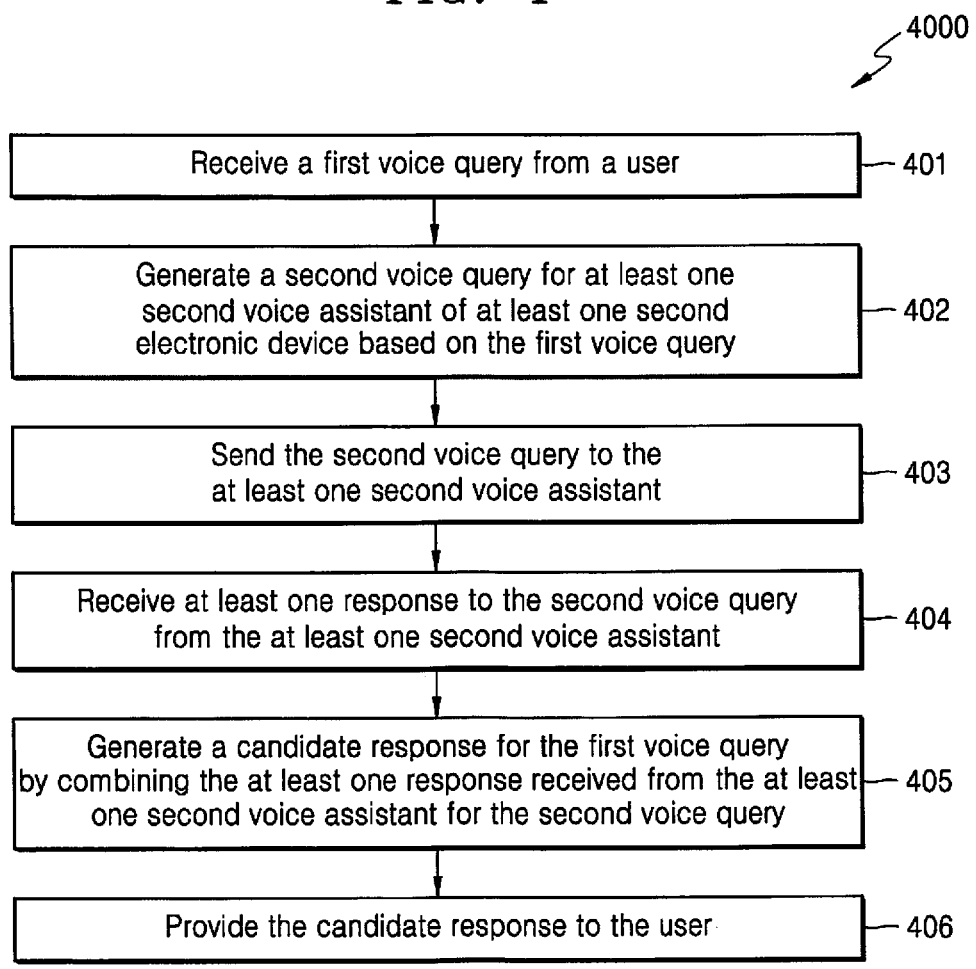
FIG. 4 illustrates a flow diagram of the capability-based processing of voice queries in a multi-assistant environment, according to an embodiment.

FIG. 4 illustrates a flow diagram 4000 of capability-based processing of voice queries in a multi-assistant environment, according to an embodiment.

In step 401, the first electronic device 100A receives the first voice query from the user. The voice query unit 111A may receive the first voice query from the user. In step 402, the method includes generating the second voice query for the at least one second VA 122 of the at least one second electronic device 100B based on the first voice query. The voice query unit 111A may generate the second voice query for the at least one second VA 122 of the at least one second electronic device 100B based on the first voice query. In step 403, the method includes sending the second voice query to the at least one second VA 122. The voice query unit 111A may send the second voice query to the at least one second VA 122.

In step 404, the method includes receiving the at least one response to the second voice query from the at least one second VA 122. The VA unit 112A may receive the at least one response to the second voice query from the at least one second VA 122. In step 405, the method includes generating the candidate response for the first voice query by combining the at least one response received from the at least one second VA 122 for the second voice query. The VA unit 112A may generate the candidate response for the first voice query by combining the at least one response received from the at least one second VA 122 for the second voice query. In step 406, the method includes providing the candidate response to the user. The VA unit 112A may provide the candidate response to the user.

The various actions, acts, blocks, steps, or the like in the flow diagram 4000 may be performed in the order presented, in a different order or simultaneously. Further, in some embodiments, some of the actions, acts, blocks, steps, or the like may be omitted, added, modified, skipped, or the like without departing from the scope of the disclosure.

Figure 5:
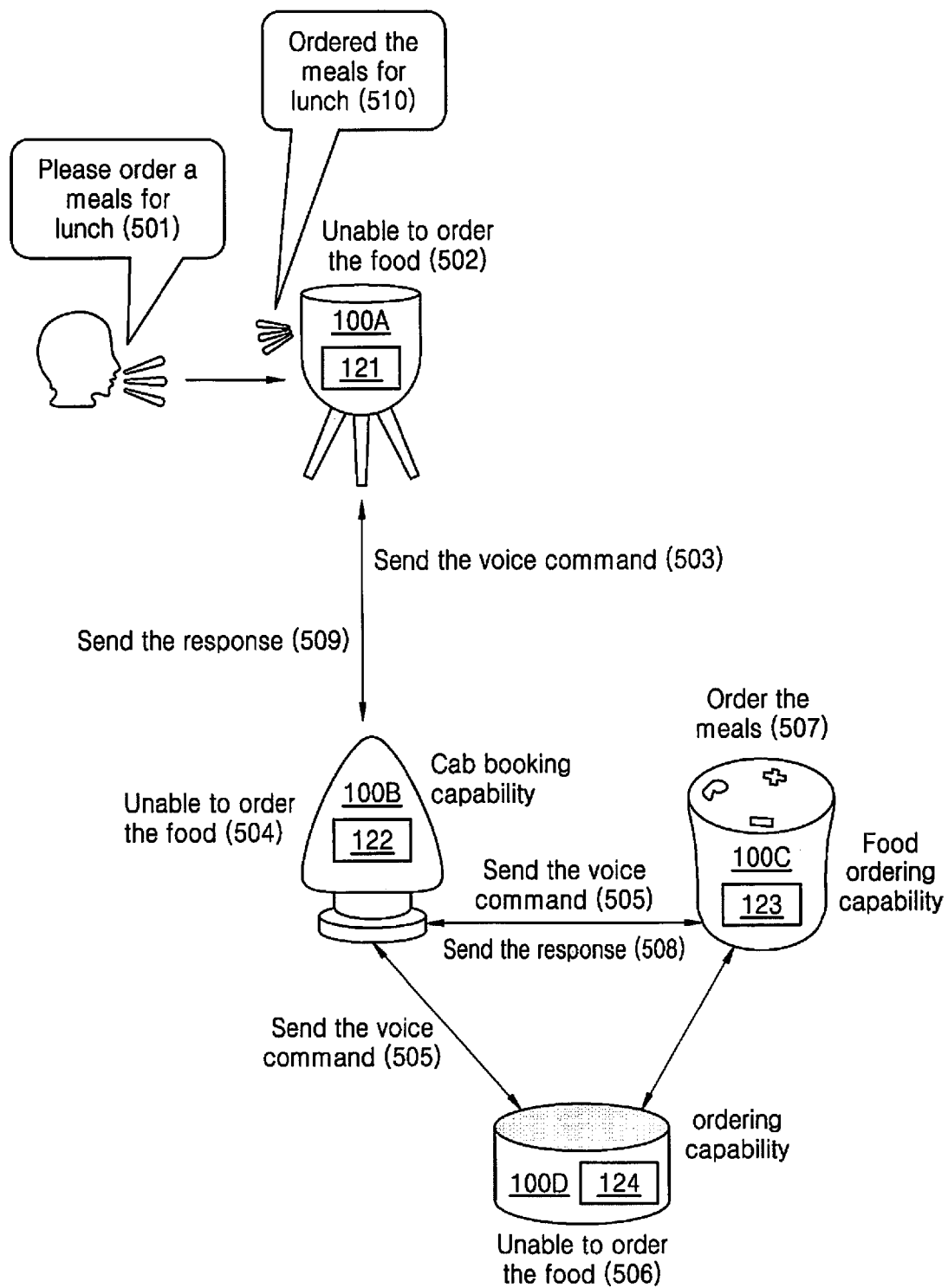
FIG. 5 illustrates an example scenario of providing a response with respect to a voice query from a user in a multi-assistant environment, according to an embodiment.

FIG. 5 illustrates an example scenario of providing a response with respect to a voice query from a user in a multi-assistant environment, according to an embodiment.

The user may be present in the proximity of the first electronic device 100A, the second electronic device 100B, the third electronic device 100C, and the fourth electronic device 100D. The first electronic device 100A may include the first VA 121, where the first VA 121 has the capability to perform instant messaging. The second electronic device 100B may include the second VA 122, where the second VA 122 has the capability to book a cab. The third electronic device 100C may include the third VA 123, where the third VA 123 has the capability to order food.

The fourth electronic device 100D may include the fourth VA 124, where the fourth VA 124 has the capability to play music. The user may be registered to or authorized to use the first electronic device 100A to use the first VA 121. The user may be unregistered to or unauthorized to use the electronic device 100B, electronic device 100C, and electronic device 100D. The second electronic device 100B, the third electronic device 100C, and the fourth electronic device 100D are connected to each other via a network, where the first electronic device 100A is connected to the network by connecting to the second electronic device 100B. The network connection may be wired and/or wireless.

Referring to FIG. 5, in step 501, the user provides a voice query to the first electronic device 100A for ordering meals for lunch. The first electronic device 100A receives the voice query of the user, and the third electronic device 100C and the fourth electronic device 100D also receive the voice query of the user and reject providing a response to the user. In step 502, the first electronic device 100A determines that the first VA 121 is incapable of ordering the food. Therefore, the first electronic device 100A sends the voice query to the other electronic devices via the network in step 503. The second electronic device 100B may receive the voice query from the first electronic device 100A. In step 504, the second electronic device 100B determines that the second VA 122 is also incapable of ordering the food. In step 505, the second electronic device 100B broadcasts the voice query to the third electronic device 100C and the fourth electronic device 100D via the network.

In step 506, the fourth electronic device 100D determines that the fourth VA 124 does not have the capability of ordering the food. In step 507, the third electronic device 100C determines that the third VA 123 has the capability of ordering the food. The third electronic device 100C provides the voice query to the third VA 123 for generating a proper response to the voice query for the second electronic device 100B. The third VA 123 processes the voice query for ordering the meals and orders the meals using a food-ordering application. In step 508, the third electronic device 100C sends the response, "Ordered the meals for the lunch" to the second electronic device 100B. In step 509, the second electronic device 100B relays the response to the first electronic device 100A. In step 510, the first electronic device 100A delivers the response in the form of the audio response to the user when receiving the response from the second electronic device 100B.

Figure 6A:
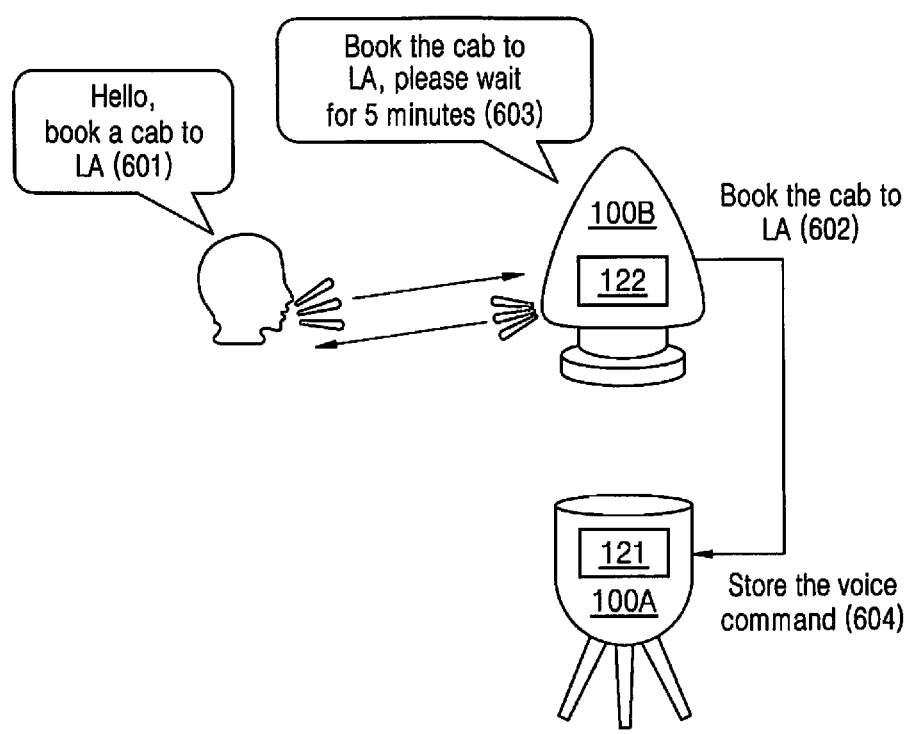
FIG. 6A illustrates an example scenario of generating a response to a voice query, according to an embodiment.

FIG. 6A illustrates an example scenario of generating a response to the voice query, according to an embodiment.

Referring to FIG. 6A, the user is close to the first electronic device 100A and the second electronic device 100B. The first electronic device 100A may include the first VA 121 which has the capability of processing or parsing an instant message. The second electronic device 100B may include the second VA 122 which has the capability of booking the cab. The user may be registered to or authorized to use the first electronic device 100A to use the first VA 121 and the second electronic device 100B to use the second VA 122. The first electronic device 100A may be connected to the second electronic device 100B via a wired or a wireless network.

In step 601, the user provides the first voice query to the second electronic device 100B for booking a cab to Los Angeles (LA). The second electronic device 100B may receive the first voice query of the user for providing a response to the user. Further, the second electronic device 100B may determine that the second VA 122 has the capability of booking the cab. The second electronic device 100B may provide the first voice query to the second VA 122 for generating a response to the user. In step 602, the second VA 122 processes and/or parses the first voice query for booking the cab to LA from the user's current location using a cab booking application. In step 603, the second electronic device 100B delivers the response "Booked the cab to LA, please wait for 5 minutes" to the user in the form of an audio response in response to the user's voice query of booking the cab to LA by the second VA 122. Then, the second electronic device 100B sends the first voice query to the first electronic device 100A, and in step 604, the first electronic device 100A stores the first voice query of the user.

Figure 6B:
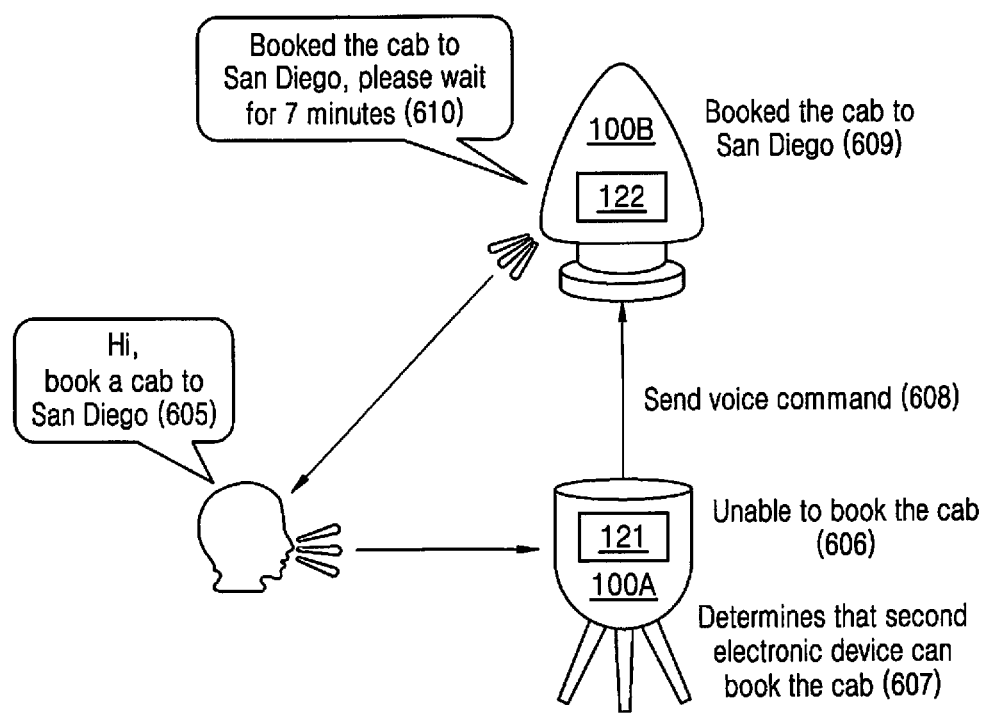
FIG. 6B illustrates an example scenario of generating a response to a voice query, according to an embodiment.

FIG. 6B illustrates an example scenario of generating a response to a voice query, according to an embodiment.

In step 605, the user provides the second voice query to the first electronic device 100A for booking the cab to San Diego. The first electronic device 100A receives the second voice query of the user for providing a response to the user. In step 606, the first electronic device 100A determines that the first VA 121 does not have the capability of booking the cab. Further, the first electronic device 100A may determine that the second voice query is related to the stored first voice query because both of the voice queries are of the same type (i.e. voice query for booking a cab). In step 607, the first electronic device 100A determines that the second electronic device 100B is capable of booking the cab based on the type analysis with both of the voice queries. In step 608, the first electronic device 100A sends the second voice query to the second electronic device 100B. The second electronic device 100B may determine that the second VA 122 has the capability of booking the cab in response to receiving the second voice query. The second electronic device 100B may provide the second voice query to the second VA 122 for generating a response to the user. In step 609, the second VA 122 processes and/or parses the second voice query for booking the cab to San Diego from the user's current location using the cab booking application. In step 610, the second electronic device 100B delivers the response of "Booking of the cab to San Diego completed! Please wait for 7 minutes" to the user in the form of an audio response.

Figure 6C:
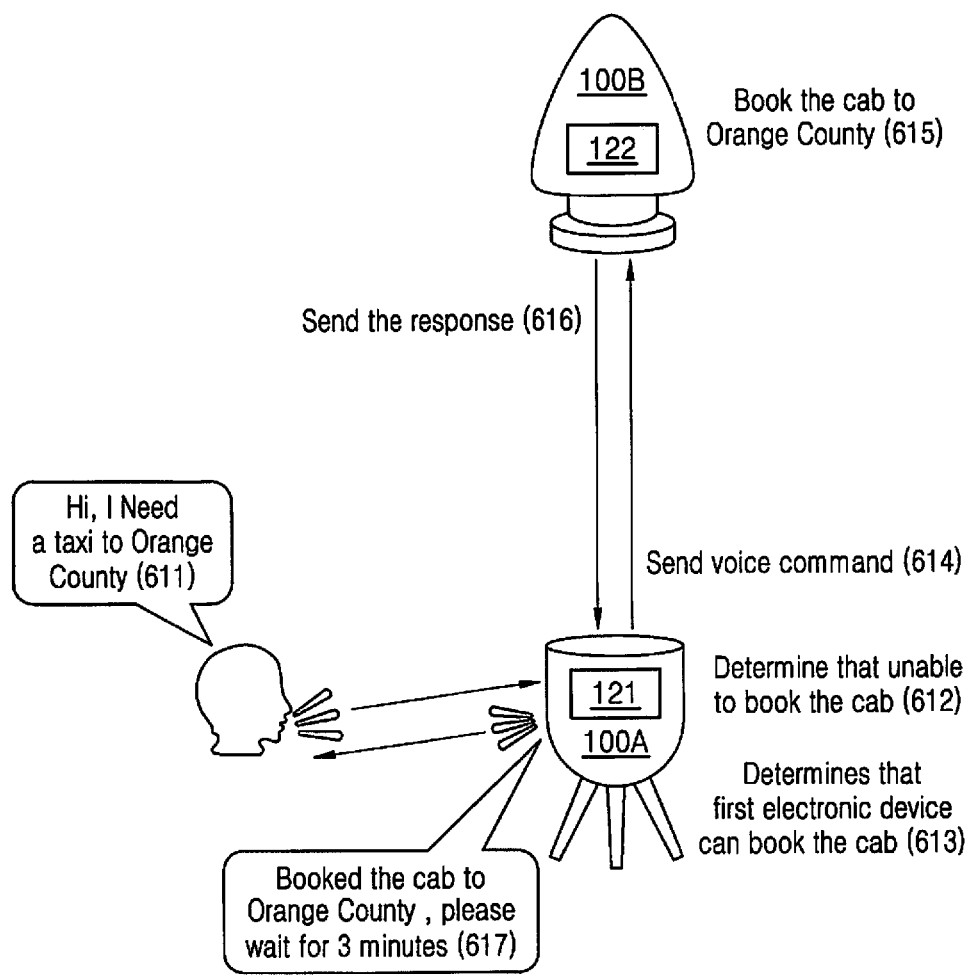
FIG. 6C illustrates an example scenario of generating a response to a voice query, according to an embodiment.

FIG. 6C illustrates an example scenario of generating a response to a voice query, according to an embodiment.

Referring to FIG. 6C, the user is present in the proximity of the first electronic device 100A and away from the second electronic device 100B. In other words, the second electronic device 100B may not be able to detect a voice query from the user. The first electronic device 100A may include the first VA 121 which has the capability of detecting and/or parsing an instant message. The second electronic device 100B may include the second VA 122 which has the capability of booking the cab. The user may be registered to and/or authorized to use the first electronic device 100A to use the first VA 121 and registered to and/or authorized to use the second electronic device 100B to use the second VA 122. The first electronic device 100A may be connected to the second electronic device 100B via a wireless and/or a wired network.

In step 611, the user provides a third voice query to the first electronic device 100A for booking a taxi to Orange County. The first electronic device 100A may receive the third voice query from the user for providing a response to the user. In step 612, the first electronic device 100A determines that the first VA 121 does not have the capability of booking a cab. Further, the first electronic device 100A may determine that the third voice query is related to the stored first voice query and both of the voice queries are of the same type (i.e. booking a cab) based on the analysis and/or the parsing of the voice query. In step 613, the first electronic device 100A determines that the second electronic device 100B can book the cab based on the relationship between both of the voice queries. In step 614, the first electronic device 100A sends the third voice query to the second electronic device 100B. The second electronic device 100B may determine that the second VA 122 has the capability of booking the cab in response to receiving the third voice query. The second electronic device 100B may provide the third voice query to the second VA 122 for generating a response to the user. In step 615, the second VA 122 processes the third voice query for booking the cab to Orange County from the user's current location through the cab booking application. In step 616, the second electronic device 100B sends the response of "Booked the cab to Orange County, please wait for 3 minutes" to the first electronic device 100A in response to a determination that the user is located away from the second electronic device 100B. In step 617, the first electronic device 100A delivers the received response to the user in the form of the audio response.

Figure 7:
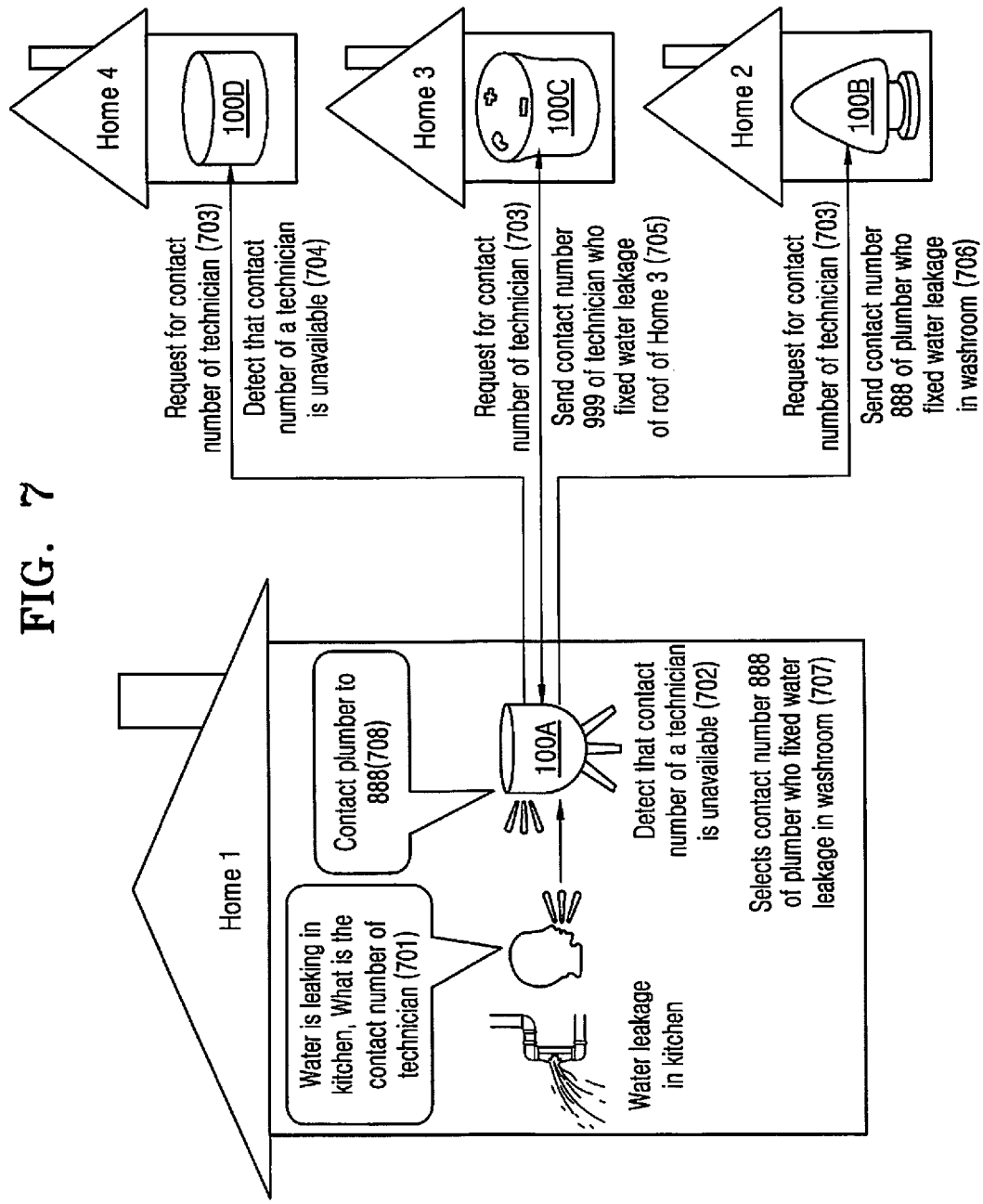
FIG. 7 illustrates an example scenario of providing a candidate response among multiple responses to a voice query, according to an embodiment.

FIG. 7 illustrates an example scenario of providing a candidate response among multiple responses to a voice query, according to an embodiment.

Referring to FIG. 7, the user is located close to the first electronic device 100A at Home 1. The second electronic device 100B is available at Home 2 where the user is away from the second electronic device 100A. The third electronic device 100C is available in Home 3 where the user is away from the third electronic device 100C. The fourth electronic device 100D is available at Home 4 where the user is away from the fourth electronic device 100D. The user may be registered to and authorized to use the first electronic device 100A to use the first VA 121. The first electronic device 100A may be connected to the second electronic device 100B, the third electronic device 100C, and the fourth electronic device 100D via a wired and/or a wireless network. The first electronic device 100A may include the first VA 121. The second electronic device 100B may include the second VA 122. The third electronic device 100C may include the third VA 123. The fourth electronic device 100C may include the fourth VA 123. The first VA 121 to fourth VA 124 may each have the capability of processing, parsing and/or detecting an instant message.

In step 701, the user faces water leakage of a tap at the kitchen in Home 1 and needs contact information (e.g. a contact number) of a plumber to fix the problem. The contact number of the plumber is determined to be unavailable at the first electronic device 100A and the fourth electronic device 100D. It is determined that the contact number of the plumber who repaired a water leakage of a tap in a washroom of the Home 2 is available at the second electronic device 100B. The contact information of a technician who repairs the water leakage of the roof of Home 3 is available at the third electronic device 100C.

In step 701, the user provides the voice query to the first electronic device 100A for repairing the water leakage of the tap at the kitchen in Home 1. The first electronic device 100A may receive the voice query of the user for providing a response to the user. In step 702, the first electronic device 100A determines that the first VA 121 does not have the contact number of the plumber for repairing the water leakage of the tap. In step 703, the first electronic device 100A broadcasts the voice query to the second electronic device 100B, third electronic device 100C, and fourth electronic device 100D. In step 704, the fourth electronic device 100D determines that the contact number of the plumber to repair the water leakage of the tap is unavailable. Thus, the fourth electronic device 100D does not provide a response to the first electronic device 100A. The third electronic device 100C may determine that the contact number of the plumber who can repair the water leakage of the roof is available.

In step 705, the third electronic device 100C sends a response including the contact number of the technician who can repair the water leakage of the roof to the first electronic device 100A. In step 706, the second electronic device 100B determines that the contact number of the plumber who repairs the water leakage of the washroom is available in response to the voice query. Next, the second electronic device 100B may send the response including the contact number of the plumber to the first electronic device 100A. In step 707, the first electronic device 100A selects the response including the contact number of the plumber who repairs the water leakage of the washroom from the second electronic device 100B as the candidate response based on matching analysis made between the voice query and each response. The matching analysis may be performed by parsing and detecting the words "plumber," "water leakage," and/or "washroom." Since the water leakage in the washroom is more similar to the water leakage in the kitchen based on the parsing and detecting of the words in the response, the first electronic device 100A may select the contact number of the plumber from the second electronic device 100B as the most appropriate response to the voice query. In step 708, the first electronic device 100A delivers, as the most appropriate response, the candidate response including the contact number of the plumber to the user in the form of the audio response.

Figure 8:
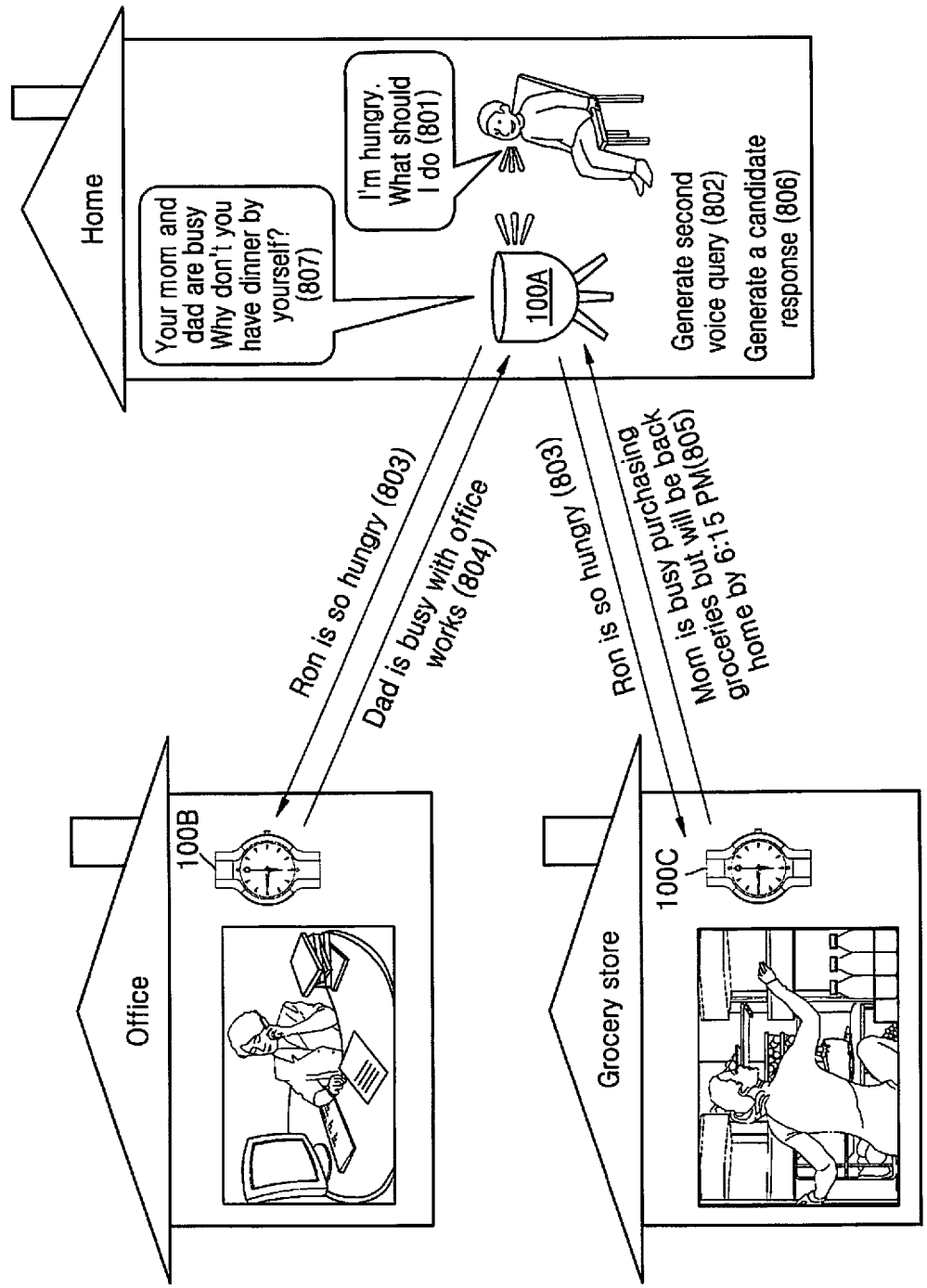
FIG. 8 illustrates an example scenario of generating a candidate response with multiple responses, according to an embodiment.

FIG. 8 illustrates an example scenario of generating a candidate response with multiple responses, according to an embodiment.

Referring to FIG. 8, Ron is registered to and/or authorized to use the first electronic device 100A to use the first electronic device 100A. Ron's Dad may be busy working in his office. Dad may wear a smart watch 100B which may be the second electronic device 100B. Dad may be registered to and/or an authorized user of the smart watch 100B. The smart watch 100B may monitor the activities of Dad. Ron's Mom may be busy at the grocery store buying groceries. Mom may wear a smart watch 100C which may be the third electronic device 100C. Ron's Mom may be registered to and/or an authorized user of the smart watch 100C. The smart watch 100C may monitor the activities of Mom. The smart speaker may be the first electronic device 100A and may be wirelessly connected to the smart watch 100B and the smart watch 100C.

In step 801 Ron is located in the proximity of the smart speaker 100A and Ron provides the first voice query of "I'm hungry. What should I do?" to the smart speaker 100A at 5:45 PM. In step 802, the smart speaker 100A receives the voice query and generates the second voice query of "Ron is hungry" by modifying the first voice query. In step 803, the smart speaker 100A broadcasts the second voice query to the smart watch 100B and smart watch 100C for the parents of Ron to recognize that Ron is now hungry. The smart watch 100B detects that Dad is busy with office work until 9:00 PM based on the schedule application in the smart watch 100B. In step 804, the smart watch 100B generates and sends the response "Dad is busy with office work" in response to receiving the second voice query from the smart speaker 100A. The smart watch 100C may detect that Mom is busy purchasing groceries.

In step 805, the smart watch 100C generates and sends the response "Mom is busy purchasing groceries but will be back home by 6:15 PM" in response to receiving the second voice query from the smart speaker 100A. In step 807, the smart speaker 100A generates the candidate response of "Your Mom and Dad are busy. Why don't you have dinner by yourself?" for the first voice query by combining the responses received from the smart watch 100B and the smart watch 100C for the second voice query.

In an embodiment, Dad is still busy but Mom is scheduled to come back home by 6:15 PM based on the credit card payment occurring at 5:40 PM at the grocery store and the location of the grocery store. The smart watch 100C may calculate the distance and time to be back home from the grocery store based on the occurrence of the payment event and location information. The smart speaker 100A may generate and send a candidate response of "Dad is busy but Mom will be back by 6:15 PM. Why don't you wait until 6:15 PM?" in response to the first voice query by combining the responses received from the smart watch 100B and the smart watch 100C.

The embodiments disclosed herein can be implemented using at least one software program running on at least one hardware device and performing network management functions to control the elements.

The foregoing description of specific embodiments fully reveal the general nature of the embodiments herein that others can, by applying current knowledge, readily modify and/or adapt for various applications, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method of processing commands by a first assistant device, the method comprising:
   receiving an audio command from a user;
   determining that a proper response to the audio command is unavailable in the first assistant device based on analyzing the audio command;
   transmitting the audio command to a plurality of assistant devices including a second assistant device;
   receiving a plurality of responses from each of the plurality of assistant devices;
   analyzing each of the plurality of responses;
   selecting a most proper response based on parameters comprising consumer ratings and price information; and
   providing the most proper response to the user.

2. The method of claim 1, wherein determining that the proper response is unavailable further comprises determining that a proper application to process the audio command is unavailable in the first assistant device.

3. The method of claim 1, further comprising connecting to the second assistant device.

4. The method of claim 1,
   wherein the first assistant device is connected to the plurality of assistant devices via a network.

5. The method of claim 4, wherein the plurality of assistant devices are authorized to be used by the user.

6. The method of claim 1, wherein the parameters further comprise time information or location information included in the plurality of responses.

7. The method of claim 1, further comprising:
   generating a response by combining the plurality of responses; and
   wherein providing the most proper response to the user comprises providing a response to the user.

8. The method of claim 1, further comprising storing the most proper response to a database of the first assistant device.

9. The method of claim 1, wherein receiving the plurality of responses further comprises receiving at least one response generated by a third assistant device, wherein the audio command is forwarded to the third assistant device by the second assistant device.

10. The method of claim 9, wherein the audio command is forwarded to the third assistant device based on a determination that a proper response to the audio command is unavailable at the second assistant device.

11. The method of claim 1, wherein the audio command comprises a query or a command by a voice of the user.

12. A first assistant apparatus for processing an audio command, the first assistant apparatus comprising:
   a sensor that receives an audio command from a user; and
   a processor that:
      determines that a proper response to the audio command is unavailable in the first assistant apparatus based on analyzing the audio command,
      transmits the audio command to a plurality of assistant devices including a second assistant device,
      receives a plurality of responses from each of the plurality of assistant devices;
      analyzes each of the plurality of responses;
      selects a most proper response based on parameters comprising consumer ratings and price information; and
      provides the most proper response to the user,
      wherein each of the sensor and the processor is implemented as a hardware device, respectively.

13. The first assistant apparatus of claim 12, wherein determining that the proper response is unavailable further comprises determining that a proper application to process the audio command is unavailable in the first assistant apparatus.

14. The first assistant apparatus of claim 12,
   wherein the first assistant apparatus is connected to the plurality of assistant devices via a network.

15. The first assistant apparatus of claim 14,
   wherein the processor generates a response by combining the plurality of responses, and
   wherein providing the most proper response to the user comprises providing a response to the user.

16. The first assistant apparatus of claim 12, wherein the processor receives at least one response generated by a third assistant device, wherein the audio command is forwarded to the third assistant device by the second assistant device.

17. The first assistant apparatus of claim 16, wherein the audio command is forwarded to the third assistant based on a determination that a proper response to the audio command is unavailable at the second assistant device.

18. A non-transitory computer-readable medium storing instructions thereon that, when executed, instruct at least one processor to perform a method, the method comprising:
   receiving an audio command from a user;

determining that a proper response to the audio command is unavailable in a first assistant device based on analyzing the audio command;
transmitting the audio command to a plurality of assistant devices including a second assistant device;
receiving a plurality of responses from each of the plurality of assistant devices;
analyzing each of the plurality of responses;
selecting a most proper response based on parameters comprising consumer ratings and price information; and
providing the most proper response to the user.

* * * * *